United States Patent
Onuma

(10) Patent No.: US 11,148,565 B2
(45) Date of Patent: Oct. 19, 2021

(54) VEHICLE SEAT

(71) Applicant: TS TECH CO., LTD., Asaka (JP)

(72) Inventor: Koji Onuma, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 16/496,818

(22) PCT Filed: Sep. 26, 2017

(86) PCT No.: PCT/JP2017/034639
§ 371 (c)(1),
(2) Date: Sep. 23, 2019

(87) PCT Pub. No.: WO2018/173336
PCT Pub. Date: Sep. 27, 2018

(65) Prior Publication Data
US 2020/0282885 A1   Sep. 10, 2020

(30) Foreign Application Priority Data

Mar. 24, 2017  (JP) .............................. JP2017-058877
Mar. 24, 2017  (JP) .............................. JP2017-058879
Mar. 24, 2017  (JP) .............................. JP2017-058881

(51) Int. Cl.
*A47C 7/02*   (2006.01)
*B60N 2/16*   (2006.01)
(Continued)

(52) U.S. Cl.
CPC ........... *B60N 2/682* (2013.01); *B60N 2/6027* (2013.01); *B60N 2/0722* (2013.01)

(58) Field of Classification Search
CPC ........ B60N 2/682; B60N 2/68; B60N 2/6027; B60N 2/0722; B60N 2/686
See application file for complete search history.

(56) References Cited

U.S. PATENT DOCUMENTS 5,692,727 A    12/1997   Kashiwamura et al.
9,630,527 B2    4/2017   Matsui
(Continued)

FOREIGN PATENT DOCUMENTS

JP    2001120383    5/2001
JP    2002225600    8/2002
(Continued)

OTHER PUBLICATIONS

International Search Report issued for International Patent Application No. PCT/JP2017/034639, dated Jan. 9, 2018, 4 pages including English translation.

(Continued)

*Primary Examiner* — Shin H Kim

(74) *Attorney, Agent, or Firm* — Hamre, Schumann, Mueller & Larson, P.C.

(57) ABSTRACT

A vehicle seat includes a pair of side frames disposed separately from each other in a lateral direction; a pair of connecting frames disposed separately from each other to connect the pair of side frames; and a supporting member including hook portions hooked on the pair of connecting frames, the supporting member being laid to bridge the pair of connecting frames, and configured to support an occupant, wherein a tubular member in which a connecting frame is disposed is provided in a position between the hook portions and the side frames. The tubular member is configured to contact the hook portion to thereby restrict a position of the supporting member in the lateral direction.

15 Claims, 11 Drawing Sheets

(51) Int. Cl.
  *B60N 2/68* (2006.01)
  *B60N 2/60* (2006.01)
  *B60N 2/07* (2006.01)

(56) References Cited

U.S. PATENT DOCUMENTS

| | | | |
|---|---|---|---|
| 9,718,383 B2* | 8/2017 | Matsui | B60N 2/68 |
| 10,532,679 B2* | 1/2020 | Onuma | B60N 2/56 |
| 10,538,212 B2* | 1/2020 | Onuma | B60N 2/002 |
| 2004/0155501 A1* | 8/2004 | McMillen | B60N 2/62 |
| | | | 297/284.4 |
| 2013/0278026 A1 | 10/2013 | Kobayashi et al. | |
| 2015/0306998 A1* | 10/2015 | Matsui | B60N 2/7094 |
| | | | 297/452.52 |
| 2015/0336477 A1 | 11/2015 | Matsui | |
| 2018/0272908 A1* | 9/2018 | Onuma | B60N 2/7094 |
| 2020/0148145 A1* | 5/2020 | Onuma | B60N 2/002 |
| 2020/0282885 A1* | 9/2020 | Onuma | B60N 2/1615 |
| 2020/0298738 A1* | 9/2020 | Tachikawa | B60N 2/68 |

FOREIGN PATENT DOCUMENTS

| | | |
|---|---|---|
| JP | 2011105251 | 6/2011 |
| JP | 2012106617 | 6/2012 |
| JP | 2015209086 | 11/2015 |
| JP | 2015223851 | 12/2015 |
| JP | 2016074398 | 5/2016 |

OTHER PUBLICATIONS

Office Action issued for Japanese Patent Application No. 2019-124192, Dispatch Date: Jul. 21, 2020, 5 pages including English translation.

Office Action issued for Japanese Patent Application No. 2018-150801, Dispatch Date: Feb. 9, 2021, 9 pages including English translation.

Office Action issued for Chinese Patent Application No. 201780088284.6, dated Aug. 13, 2021, 11 pages including English translation.

* cited by examiner

VEHICLE SEAT

TECHNICAL FIELD

The present invention relates to a vehicle seat with a supporting member configured to support an occupant.

BACKGROUND ART

A seat cushion comprising a cushion frame shaped like a picture frame wherein S springs configured as a supporting member to support an occupant are strung between a front frame and a rear frame of the cushion frame is known in the art (Patent Document 1). This seat cushion is configured such that a connecting shaft making up the rear frame has been worked and formed with grooves and retainers on which end portions of the S springs are anchored are engaged in the grooves so that the S springs are prevented from getting displaced laterally.

CITATION LIST

Patent Literatures

Patent Document 1: JP 2002-225600 A

SUMMARY OF INVENTION

However, the working required on the rear frame as in the Patent Document 1 would disadvantageously cause a considerable increase in cost.

Against this backdrop, it is an object of the present invention to provide a vehicle seat that can restrain a supporting member from getting displaced with a simple structure. It is another object of the present invention to restrain noises from being produced.

A vehicle seat conceived to achieve any of the aforementioned objects comprises: a pair of side frames disposed separately from each other in a lateral direction; a pair of connecting frames disposed separately from each other to connect the pair of side frames; and a supporting member including hook portions hooked on the pair of connecting frames, the supporting member being laid to bridge the pair of connecting frames, and configured to support an occupant, wherein a tubular member in which the connecting frame is disposed is provided in a position between the hook portions and the side frames.

The tubular member is characteristically configured to contact the hook portion to thereby restrict a position of the supporting member in the lateral direction.

With this configuration, the supporting member can be restricted in its position in the lateral direction by letting the hook portion of the supporting member get in contact with the tubular member; thus, the supporting member can be restrained from getting displaced with a simple structure. Consequently, increase in the cost of the vehicle seat can be suppressed.

In the vehicle seat described above, it is preferable that the tubular member not be fixed to the connecting frame.

This configuration in which the tubular member is not fixed to the connecting frame facilitates attachment of the tubular member to the connecting frame.

In the vehicle seat described above, the tubular member may be rotatably supported by the connecting frame.

This configuration in which the tubular member is rotatable relative to the connecting frame can make portions of the tubular member and the hook portion contactable with each other less likely to wear down.

In the vehicle seat described above, the tubular member may be fixed to the connecting frame.

With this configuration in which the tubular member is fixed to the connecting frame, the position of the tubular member is prevented from getting displaced, and thus restrictions can be placed on the position of the supporting member without fail.

In the vehicle seat described above, the supporting member may comprise a metal wire and a plastic member with which at least part of the metal wire is covered. In this configuration, a portion of the hook portion which is assigned to contact the tubular member may preferably be comprised of the plastic member.

This configuration in which the hook portion is comprised of the plastic member makes it possible to restrain noises from being produced when the hook portion is in contact with the tubular member.

In the vehicle seat describe above, the tubular member may preferably be made of plastic. The plastic making up the tubular member as described above can serve to restrain noises from being produced when the hook portion is in contact with the tubular member. In another aspect, a vehicle seat comprises: a pair of side frames disposed separately from each other in a lateral direction; a pair of connecting frames disposed separately from each other to connect the pair of side frames; and a supporting member including hook portions hooked on the pair of connecting frames, the supporting member being laid to bridge the pair of connecting frames, and configured to support an occupant.

The hook portion is characterized by comprising a restriction portion configured to restrict a position of the supporting member in a lateral direction by contacting the pair of side frames or a rotatable link connected to the pair of side frame rotatably about a first axis and connected to another member rotatably about a second axis different from the first axis.

With this configuration, the supporting member can be restricted in its position in the lateral direction by letting the hook portion of the supporting member get in contact with the side frame or rotatable link; thus, the supporting member can be restrained from getting displaced with a simple structure. Consequently, increase in the cost of the vehicle seat can be suppressed. In the vehicle seat described above, the supporting member may comprise a metal wire and a plastic member with which at least part of the metal wire is covered. In this configuration, the restriction portion may preferably be comprised of the plastic member.

This configuration in which the restriction portion is comprised of the plastic member makes it possible to restrain noises from being produced when the restriction portion is in contact with the side frame or the rotatable link.

In the vehicle seat described above, the rotatable link may preferably be rotatable integrally together with the connecting frame, or rotatably supported by the connecting frame.

With this configuration, the positions of the restriction portion and the rotatable link relative to each other are unlikely to change, and thus the restrictions on the position can be placed without fail.

In still another aspect, a vehicle seat comprises: a pair of side frames disposed separately from each other in a lateral direction; a pair of connecting frames disposed separately from each other to connect the pair of side frames; a supporting member including a main portion located between the pair of connecting frames, and hook portions extending from the main portion and hooked on the pair of connecting frames, the supporting member being laid to bridge the pair of connecting frames, and configured to support an occupant; and a cover member configured to cover the side frame.

The main portion is characterized by comprising a restriction portion configured to contact the cover member to thereby restrict a position of the supporting member in a lateral direction.

With this configuration, the supporting member can be restricted in its position in the lateral direction by letting the restriction portion provided in the main portion of the supporting member get in contact with the cover member; thus, the supporting member can be restrained from getting displaced with a simple structure. Consequently, increase in the cost of the vehicle seat can be suppressed.

In the vehicle seat described above, the cover member may be configured to include an inner wall portion located at a laterally inner side of the side frame.

In this configuration, the restriction portion may be configured to contact the inner wall portion from a laterally outer side.

Alternatively, the restriction portion may be configured to contact the inner wall portion from a laterally inner side.

In the vehicle seat described above, the cover member may be configured to surround a portion of the side frame to which the connecting frame is connected.

In this configuration, the cover member may include an extension portion extending laterally inward along the connecting frame. The hook portion may be configured to be kept out of contact with the extension portion.

In the vehicle seat described above, the cover member may preferably be made of plastic. The plastic making up the cover member as described above can serve to restrain noises from being produced when the restriction portion is in contact with the cover member.

In the vehicle seat described above, the supporting member may comprise a metal wire and a plastic member with which at least part of the metal wire is covered. In this configuration, the restriction portion may preferably be comprised of the plastic member.

This configuration in which the restriction portion is comprised of the plastic member makes it possible to restrain noises from being produced when the restriction portion is in contact with the cover member.

DESCRIPTION OF EMBODIMENT(S)

First Embodiment

Hereafter, some embodiments of the invention will be described with reference to the accompanying drawings. In the following description, the front/rear (frontward/rearward), left/right (leftward/rightward; lateral) and upper/lower (upward/downward; vertical) directions will be designated with reference to an occupant seated on a seat. Laterally inner and outer sides (laterally inward and outward) refer to directions/orientations not defined with reference to a car but defined with reference to the seat.

Figure 1:
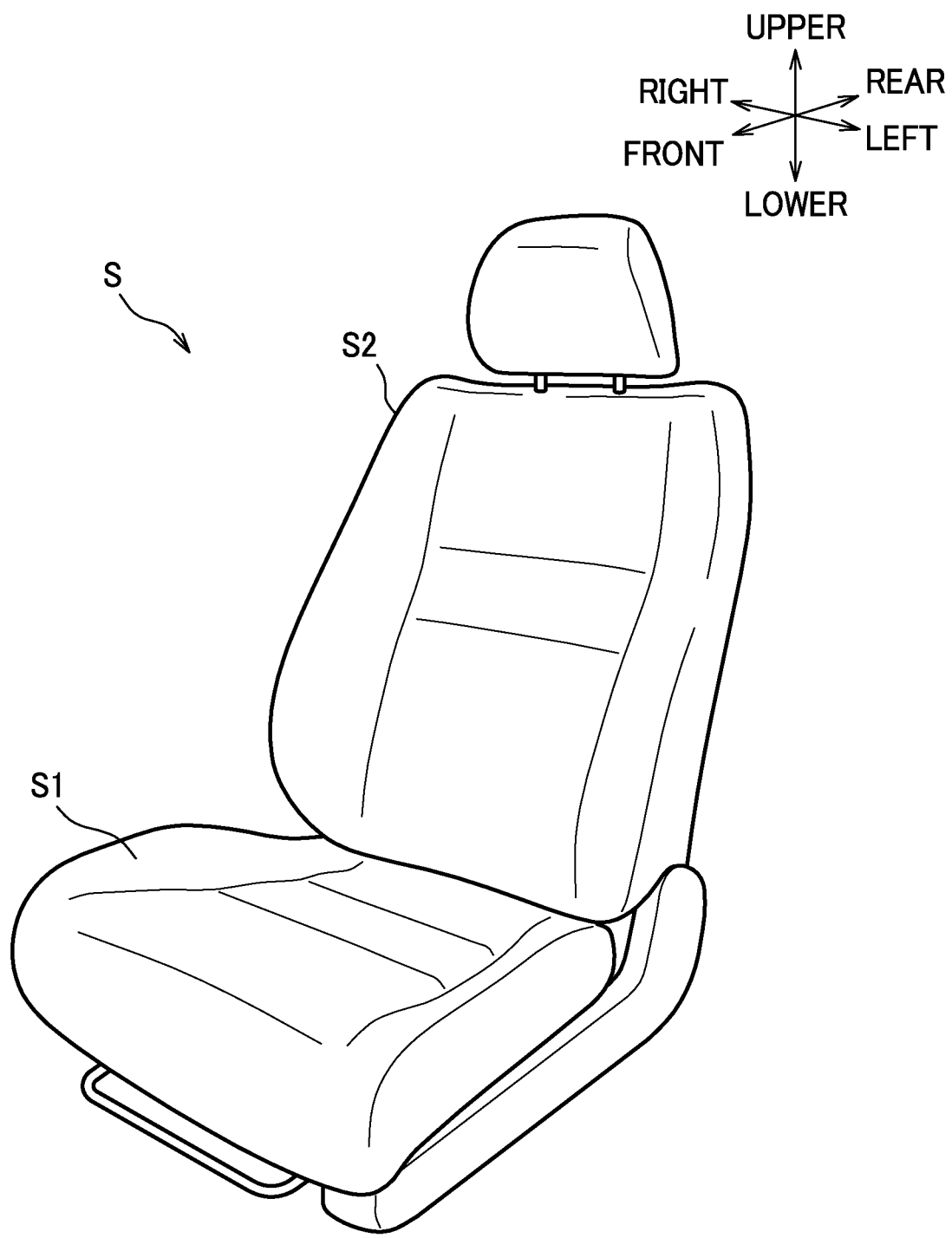
FIG. 1 is a diagram showing a car seat as a vehicle seat according to an embodiment.

As shown in FIG. 1, a vehicle seat in the present embodiment is configured as a car seat S for use in a driver's seat, a passenger seat, or the like, to be installed in an automobile, and mainly includes a seat cushion 51 and a seat back S2.

Figure 2:
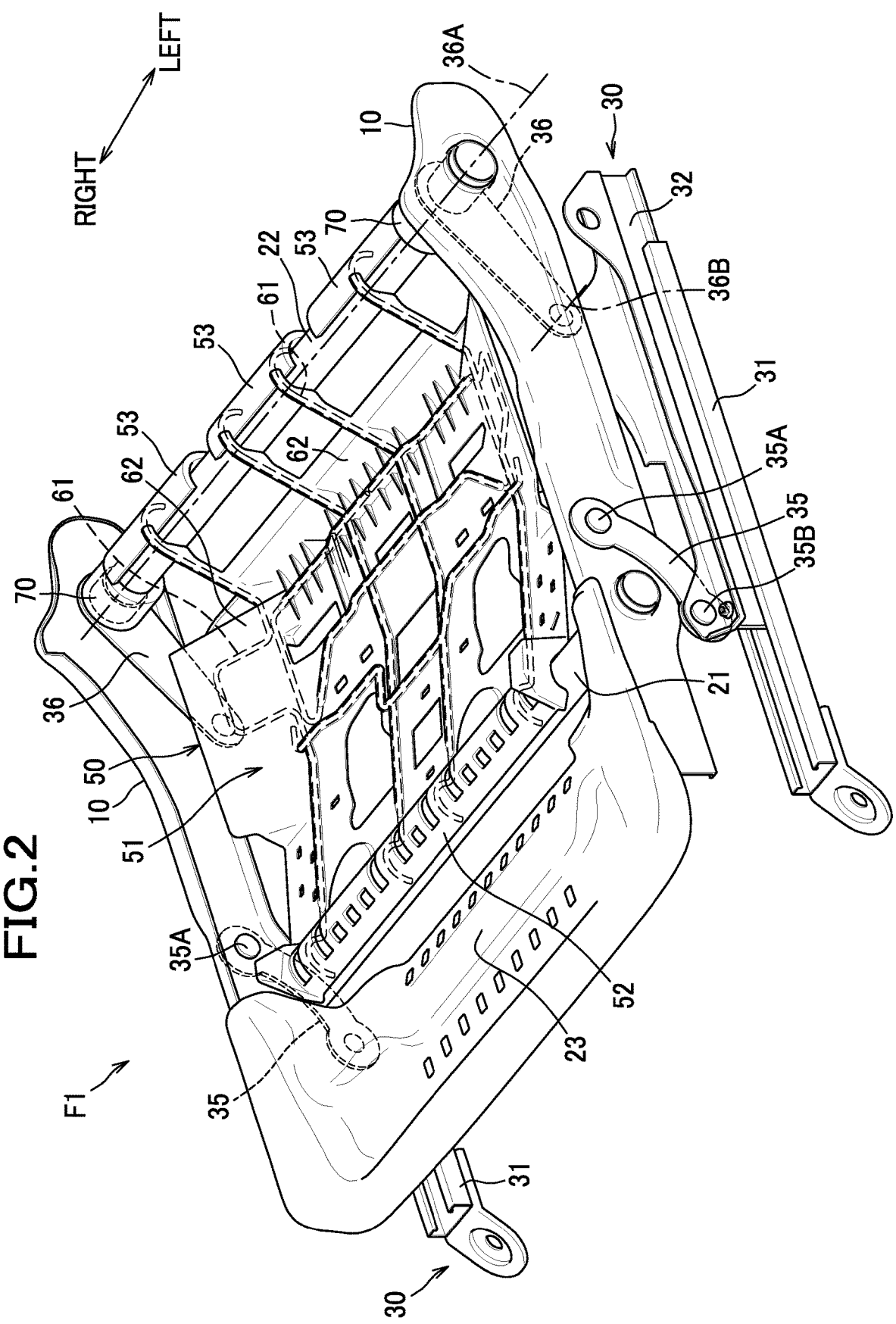
FIG. 2 is a perspective view showing a cushion frame and a supporting member in a first embodiment.

Inside the seat cushion 51, a cushion frame F1 that constitutes a frame of the seat cushion 51, as shown in FIG. 2, is incorporated. The seat cushion 51 is configured to have the cushion frame F1 upholstered with a padding made of urethane foam or the like and an outer covering made of fabrics, leather or the like. Although not shown in the drawing, the seat back S2 includes a back frame that constitutes a frame of the seat back S2, and is configured to have the back frame upholstered with a padding and an outer covering.

The cushion frame F1 includes a pair of side frames 10, a front frame 21 and a rear frame 22 as an example of a pair of connecting frames, and a pan frame 23.

The pair of side frames 10 are disposed separately from each other in a lateral direction.

The front frame 21 and the rear frame 22 are disposed separately from each other in a front-rear direction.

The front frame 21 is made of a metal pipe having a circular cross section and connects front portions of the pair of side frames 10.

The rear frame 22 is made of a metal pipe having a circular cross section and connects rear portions of the pair of side frames 10.

The pan frame 23 is a frame made of a metal plate and connects front portions of the pair of side frames 10 in a position frontward of the front frame 21.

The cushion frame F1 is supported by a slide rail mechanism 30 via a height adjustment mechanism.

The slide rail mechanism 30 comprises a pair of lower rails 31 extending long in the front-rear direction, and disposed separately in the lateral direction, and a pair of upper rails 32 each engaged with, and provided slidably in the front-rear direction relative to, the corresponding lower rail 31. The lower rails 31 are to be fixed to a floor of a car (not shown).

The height adjustment mechanism includes a pair of front links 35 and a pair of rear links 36 as an example of a rotatable link.

The front link 35 has an upper end portion rotatably joined to a front portion of the side frame 10 by means of a pin 35A, and a lower end portion rotatably joined to a front portion of the upper rail 32 by means of a pin 35B.

The rear link 36 has an upper end portion joined to the side frame 10 rotatably about a first axis 36A relative to the side frame 10. The rear link 36 has a rear end portion joined, rotatably about a second axis 36B different from the first axis 36A, to a rear portion of the upper rail 32 (another member different from the side frame 10 and the rear link 36) by means of a pin (not shown).

The front link 35 and the rear link 36, in combination with the upper rail 32 and the side frame 10, constitute a four-bar linkage. The front link 35 or the rear link 36 can be rotated relative to the side frame 10 by motor-operated or manual actuator (not shown) so that the height of the side frame 10 can be changed.

Figure 3:
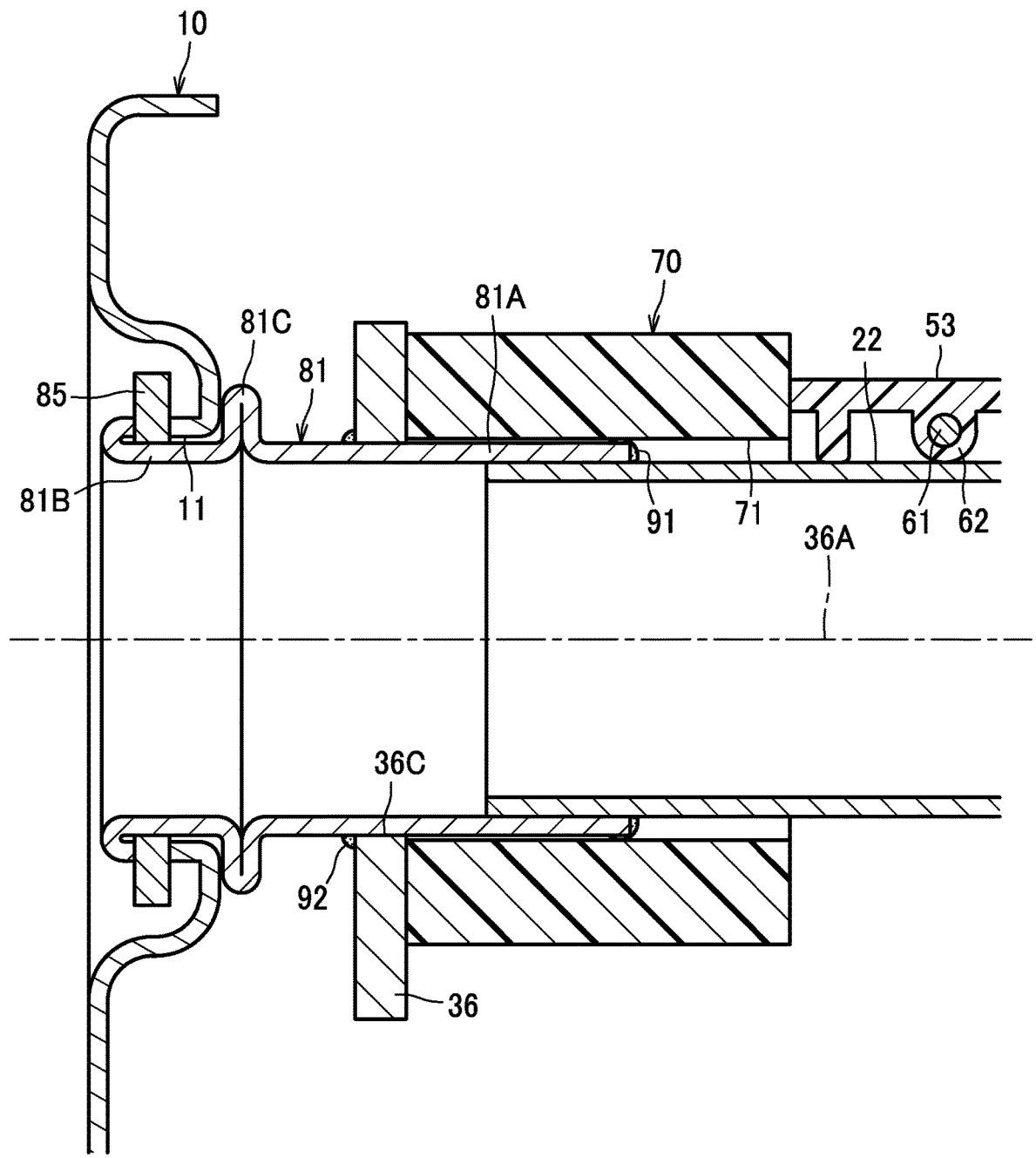
FIG. 3 is a section view taken along an axis of a rear frame of the cushion frame in the first embodiment.

As shown in FIG. 3, the rear frame 22 is joined to the side frames 10 via cylindrical brackets 81. Since configurations of respective elements at the left and at the right are substantially symmetric, FIG. 3 with reference to which the following description will be given only shows the cross section of right side portion of the cushion frame F1.

The bracket 81 includes a first cylindrical portion 81A, and a second cylindrical portion 81B located laterally outward of the first cylindrical portion 81A. The first cylindrical portion 81A and the second cylindrical portion 81B are connected via a flange 81C protruding radially outward. A laterally inner end portion of the first cylindrical portion 81A is fitted on an outside of the rear frame 22, and welded to the rear frame 22 at a weld 91.

The side frame 10 has a circular supporting hole 11. The second cylindrical portion 81B of the bracket 81 has a laterally outer end portion which is inserted in the supporting hole 11, and swaged after a washer 85 is fitted thereon at an outside of the side frame 10. With this configuration, the rear frame 22 is mounted to the side frame 10, prevented from getting disengaged therefrom, and rotatably supported by the side frame 10.

The aforementioned rear link 36 has a hole 36C; the first cylindrical portion 81A of the bracket 81 is inserted in the hole 36C, and welded to the bracket 81 at a weld 92. Accordingly, the rear link 36 is made rotatable together with the bracket 81 and the rear frame 22.

Since the rear link 36 is rotatable together with the rear frame 22, the first axis 36A coincides with an axis of the rear frame 22.

Referring back to FIG. 2, a supporting member 50 configured to support an occupant is shown as being disposed between the pair of side frames 10. The supporting member 50 is located under the padding of the seat cushion 51 (not shown), and configured to support the padding of the seat cushion 51 from below, i.e., from a side opposite to an occupant side on which an occupant is to be seated.

The supporting member 50 includes a main portion 51 that is a portion located between the front frame 21 and the rear frame 22 and configured to support an occupant, and a hook portion 52 hooked on the front frame 21 and a hook portion 53 hooked on the rear frame 22, as an example of hook portions extending from the main portion 51. Each hook portion 52, 53 has a shape of a hook having a semicircular cross section contoured to fit the corresponding profile of the front frame 21 or the rear frame 22.

The hook portion 52 is hooked on the front frame 21 and the hook portion 53 is hooked on the rear frame 22, whereby the supporting member 50 is laid to bridge the front frame 21 and the rear frame 22.

The supporting member 50 includes a plurality of metal wires 61, and a plastic member 62 with which at least part of the metal wires 61 are covered. In the present embodiment, the plastic member 62 is configured to cover the metal wires 61 in their entirety. Accordingly, without high-level anticorrosive treatment given to the metal wires 61, the corrosion of the metal wires can be retarded by the plastic member 62.

Three hook portions 53 each hooked on the rear frame 22 are provided in laterally separate positions. The hook portions 53 have laterally outer end portions comprised of the plastic members 62.

A collar 70 as an example of a tubular member is provided in each of positions between the left and right hook portions 53 and the side frames 10.

As shown in FIG. 3, the collar 70 is made of plastic, and formed in a shape of a cylinder having an insertion hole 71. The collar 70 with the rear frame 22 and the first cylindrical portion 81A of the bracket 81 being disposed in its insertion hole 71 is provided in a position between the rear link 36 and the hook portion 53. The collar 70 is not fixed to the rear frame 22 or the bracket 81, and is rotatably supported by the rear frame 22 and the bracket 81. The collar 70 has a laterally outer end portion located adjacent the rear link 36 and contactable with the rear link 36; thus, its laterally outward displacement is restricted.

The left end of the right collar 70 is adjacent to the rightmost hook portion 53. Accordingly, when the supporting member 50 tends to move to the right, the collar 70 contacts the hook portion 53 to thereby restrict the position of the supporting member 50 in the lateral direction. Although not illustrated, the left collar 70 has its right end located adjacent to the leftmost hook portion 53; thus, when the supporting member 50 tends to move to the left, the collar 70 contacts the hook portion 53 to thereby restrict the position of the supporting member 50 in the lateral direction.

Although FIG. 3 shows the state in which the collar 70 is in contact with the hook portion 53 and the rear link 36, the hook portion 53 and the collar 70 may preferably be located with some clearance left therebetween under normal conditions so that placement of the supporting member 50 into the cushion frame F1 may be facilitated. It stands to reason that the clearance between the collar 70 in contact with the left or right rear link 36 and the left or right hook portion 53 is set to be small, for example, 10 millimeters or less, enough to enable the collar 70 to place the restriction on the position of the supporting member 50 in the lateral direction.

In the car seat S configured as described above, when the supporting member 50 gets displaced in the lateral direction as a result of occupant's repeated actions of sitting on the seat cushion S1 or repeatedly exerted laterally biased force on the seat cushion S1 on which an occupant is seated, the right or left hook portion 53 contacts the collar 70, so that a further displacement of the supporting member 50 is restricted. Since the collar 70 is formed as an independent part separate from the rear frame 22, the supporting member 50 can be restrained from getting displaced with a simple structure made without increasing the manufacturing cost, as compared with an alternative configuration in which the rear frame 22 itself is worked on and thereby provided with a portion contactable with the hook portion 53.

Although a load from an occupant as imposed on the supporting member 50 with its hook portion 53 being in contact with the collar 70 would potentially produce a scraping noise due to rubbing between the hook portion 53 and the collar 70, the plastic member 62 used to form the collar 70 and the portion of the hook portion 53 contactable with the collar 70 may serve to restrain such a noise from being produced.

When the height adjustment mechanism is actuated, the rear link 36 is caused to rotate. On this occasion, the rear frame 22 and the bracket 81 as well are caused to rotate together with the rear link 36, while the collar 70 is rotatable relative to the rear frame 22 and the bracket 81; therefore, the amount of rotation of the collar 70 relative to the hook portion 53 is small. Accordingly, the portions of the hook portion 53 and the collar 70 contactable with each other can be made less likely to wear down as compared with an alternative configuration in which the collar 70 is caused to rotate together with the rear frame 22 and the bracket 81.

Since the collar 70 is not fixed to the rear frame 22 or the bracket 81, the attachment of the collar 70 can be performed with increased ease, as compared with an alternative configuration in which the collar 70 is fixed to the rear frame 22 and/or the bracket 81.

Second Embodiment

Next, a description will be given of the second embodiment of the present invention. A vehicle seat according to the second embodiment does not comprise any such collar 70 as described in relation to the first embodiment.

Figure 4:
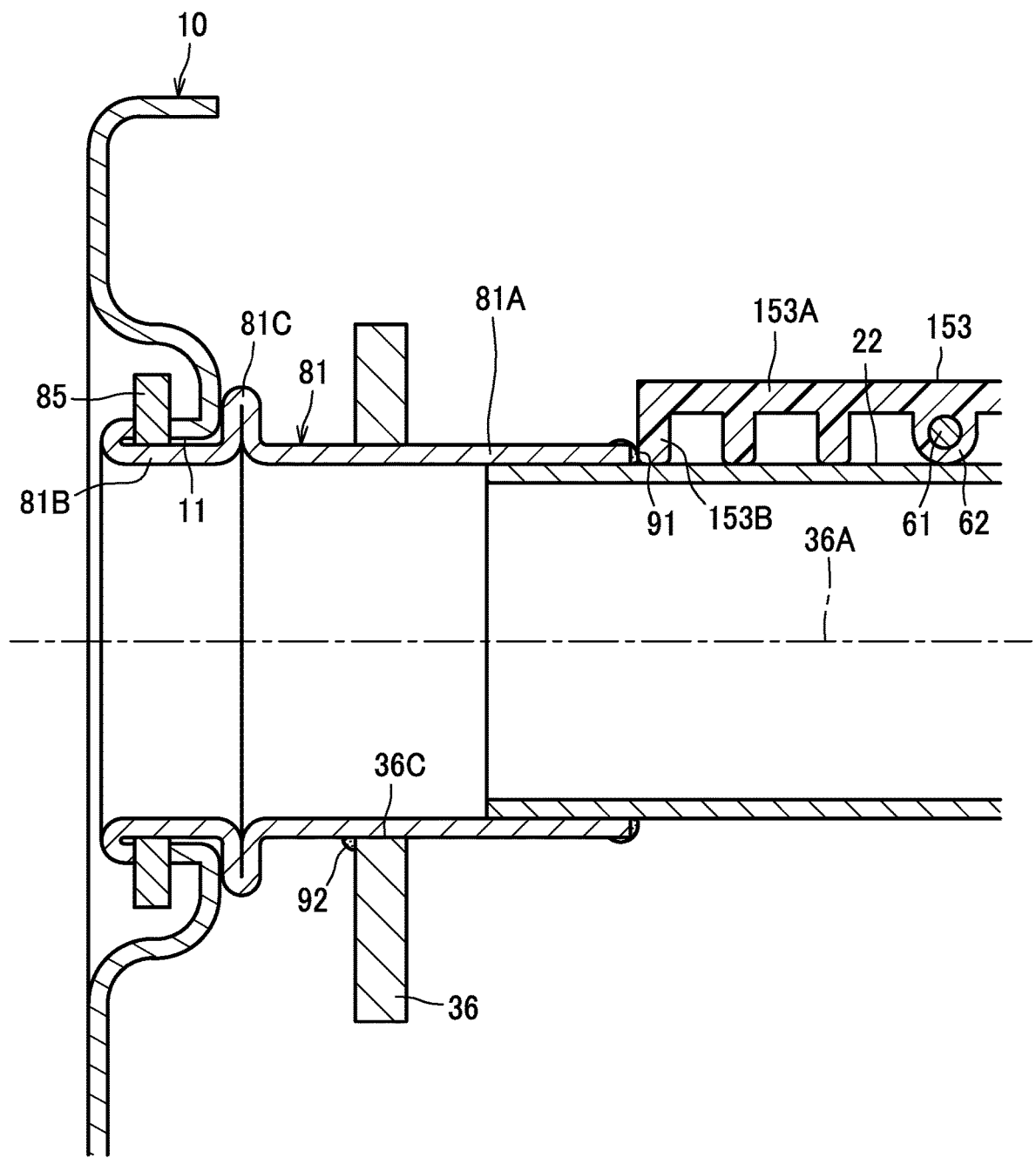
FIG. 4 is a section view taken along an axis of a rear frame of a cushion frame in a second embodiment.

As shown in FIG. 4, in the second embodiment, rear hook portions 153 of the supporting member 50 are configured to contact the bracket 81 instead of a collar. To be more specific, the rightmost hook portion 153 includes a plate-shaped portion 153A extending along the rear frame 22, and a restriction portion 153B extending from the right end of the plate-shaped portion 153A toward the rear frame 22. The restriction portion 153B is configured to contact the rear frame 22 and located adjacent the first cylindrical portion 81A of the bracket 81. The first cylindrical portion 81A is an example of a tubular member, located in a position between the hook portion 153 and the side frame 10, and fixed to the rear frame 22. The first cylindrical portion 81A has its weld 91 contactable with the restriction portion 153B when the supporting member 50 tends to move rightward to thereby restrict the position of the supporting member 50 in the lateral direction. The restriction portion 153B is comprised of the plastic member 62. The leftmost hook portion 153 has a symmetric arrangement, and similarly includes, at its left end, a restriction portion 153B comprised of the plastic member 62.

In the thus-configured car seat S as well, the position of the supporting member 50 can be restricted in a manner similar to that as described in relation to the first embodiment. Taking into consideration that the bracket 81 is a member provided to connect the rear frame 22 to the side frame 10, the supporting member 50, according to the present embodiment, can be restrained from getting displaced with a simple structure made without increasing the manufacturing cost.

In the second embodiment, similarly, noises can be restrained from being produced because the restriction portion 153B is comprised of the plastic member 62.

Since the first cylindrical portion 81A of the bracket 81 is fixed to the rear frame 22 and the rear link 36 and thus caused to rotate together with the rear frame 22 and the rear link 36 when the rear link 36 rotates, the relative positions of the restriction portion 153B and the first cylindrical portion 81A are unlikely to change even when the rear link 36 rotates, so that restrictions can be placed on the position by the cylindrical portion 81A without fail.

Third Embodiment

Figure 5:
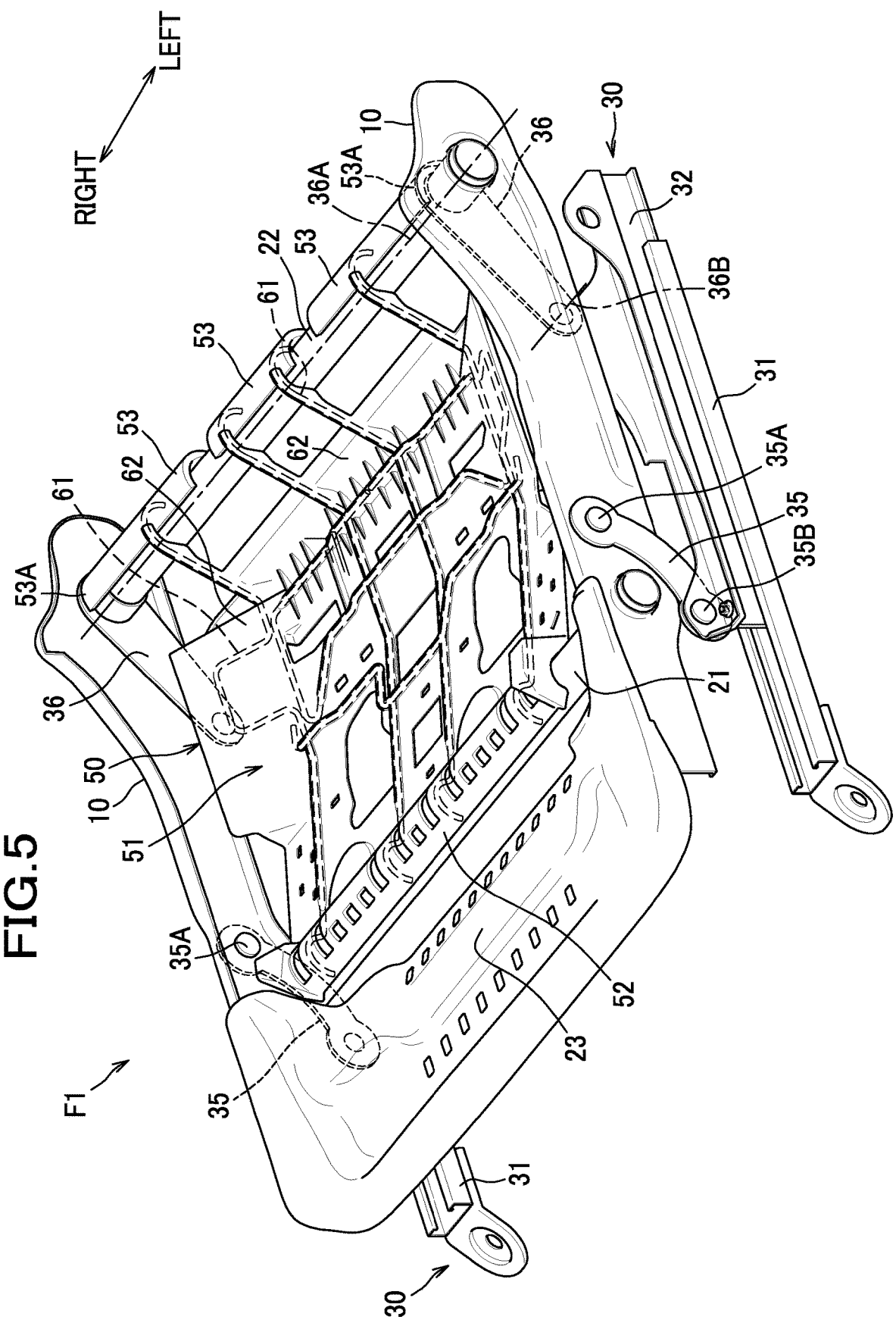
FIG. 5 is a perspective view showing a cushion frame and a supporting member in a third embodiment.
Figure 6:
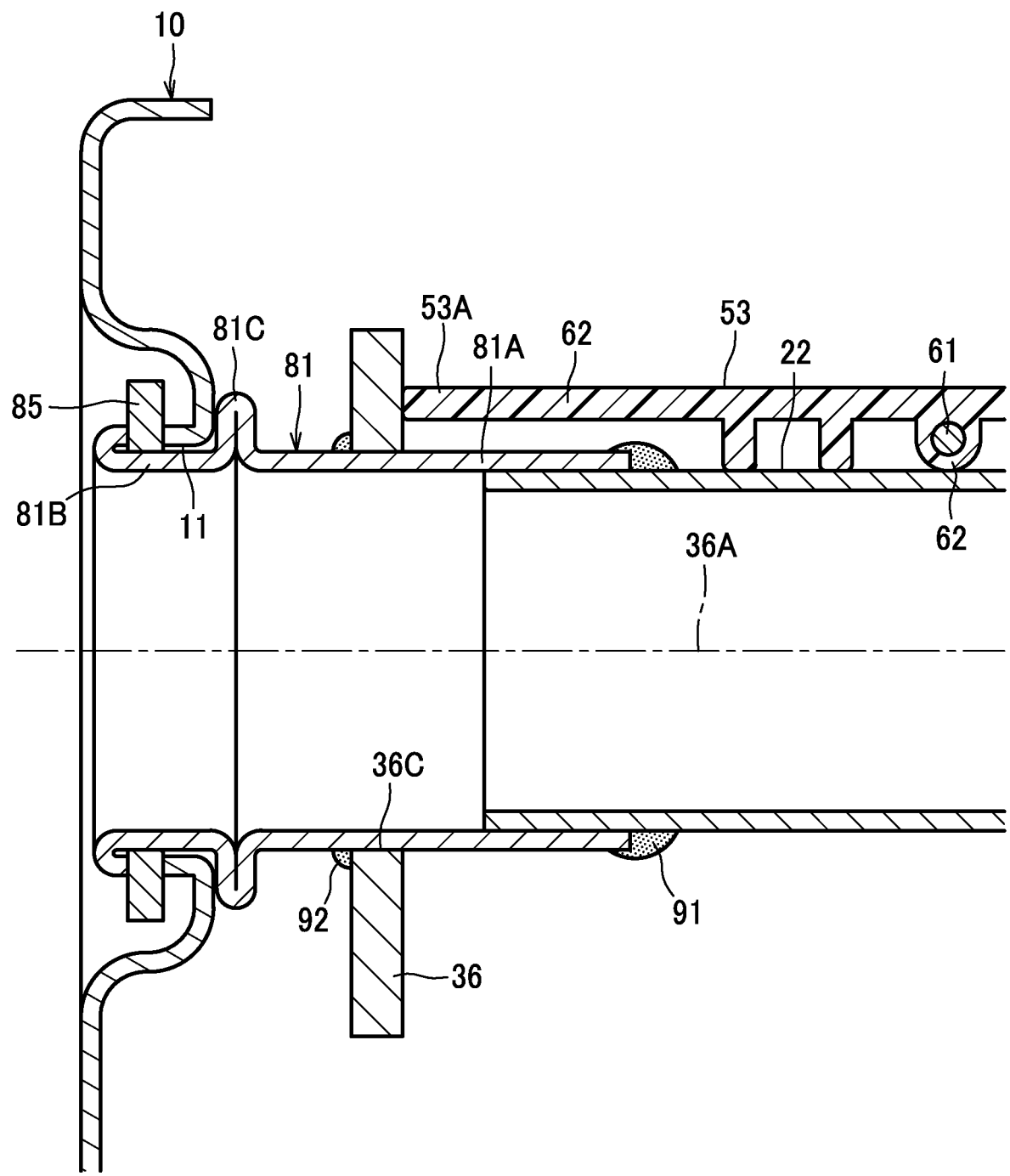
FIG. 6 is a section view taken along an axis of a rear frame of the cushion frame in the third embodiment.

As shown in FIG. 5 and FIG. 6, the rightmost hook portion 53 in the car seat S according to the third embodiment extends long to the right, and includes a right end portion configured as a restriction portion 53A contactable with the rear link 36. The restriction portion 53A is configured to contact the rear link 36 when the supporting member 50 tends to move rightward to thereby restrict the position of the supporting member 50 in the lateral direction. The restriction portion 53A is comprised of the plastic member 62. Although not illustrated in the drawings, the leftmost hook portion 53 has a symmetric arrangement, and similarly includes, at its left end, a restriction portion 53A comprised of the plastic member 62.

Although FIG. 6 shows the state in which the restriction portion 53A is in contact with the rear link 36, the restriction portion 53A and the rear link 36 may preferably be located with some clearance left therebetween under normal conditions so that placement of the supporting member 50 into the cushion frame F1 may be facilitated. It stands to reason that the clearance between the restriction portion 53A in contact with the left or right rear link 36 is set to be small, for example, 10 millimeters or less, enough to enable the restriction portion 53A to place the restriction on the position of the supporting member 50 in the lateral direction.

In the car seat S configured according to the present embodiment, the position of the supporting member 50 can be restricted in a manner similar to that as described above in relation to each of the embodiments. Taking into consideration that the rear link 36 is a member commonly provided in the vehicle seat having a height adjustment mechanism, the supporting member 50, according to the present embodiment, can be restrained from getting displaced with a simple structure made without increasing the manufacturing cost.

Although a load from an occupant as imposed on the supporting member 50 with its restriction portion 53A being in contact with the rear link 36 would potentially produce a scraping noise due to rubbing between the rear link 36 and the restriction portion 53A, the plastic member 62 used to form the restriction portion 53A may serve to restrain such a noise from being produced.

When the height adjustment mechanism is actuated, the rear link 36 is caused to rotate. On this occasion, if the restriction portion 53A is in contact with the rear link 36, a scraping noise would potentially be produced due to rubbing between the rear link 36 and the restriction portion 53A; however, the plastic member 62 used to form the restriction portion 53A may serve to restrain such a noise from being produced. Moreover, since the rear link 36 is caused to rotate together with the rear frame 22, the relative positions of the restriction portion 53A and the rear link 36 are unlikely to change even when the rear link 36 rotates, so that restrictions can be placed on the position by the restriction portion 53A without fail.

Fourth Embodiment

Figure 7:
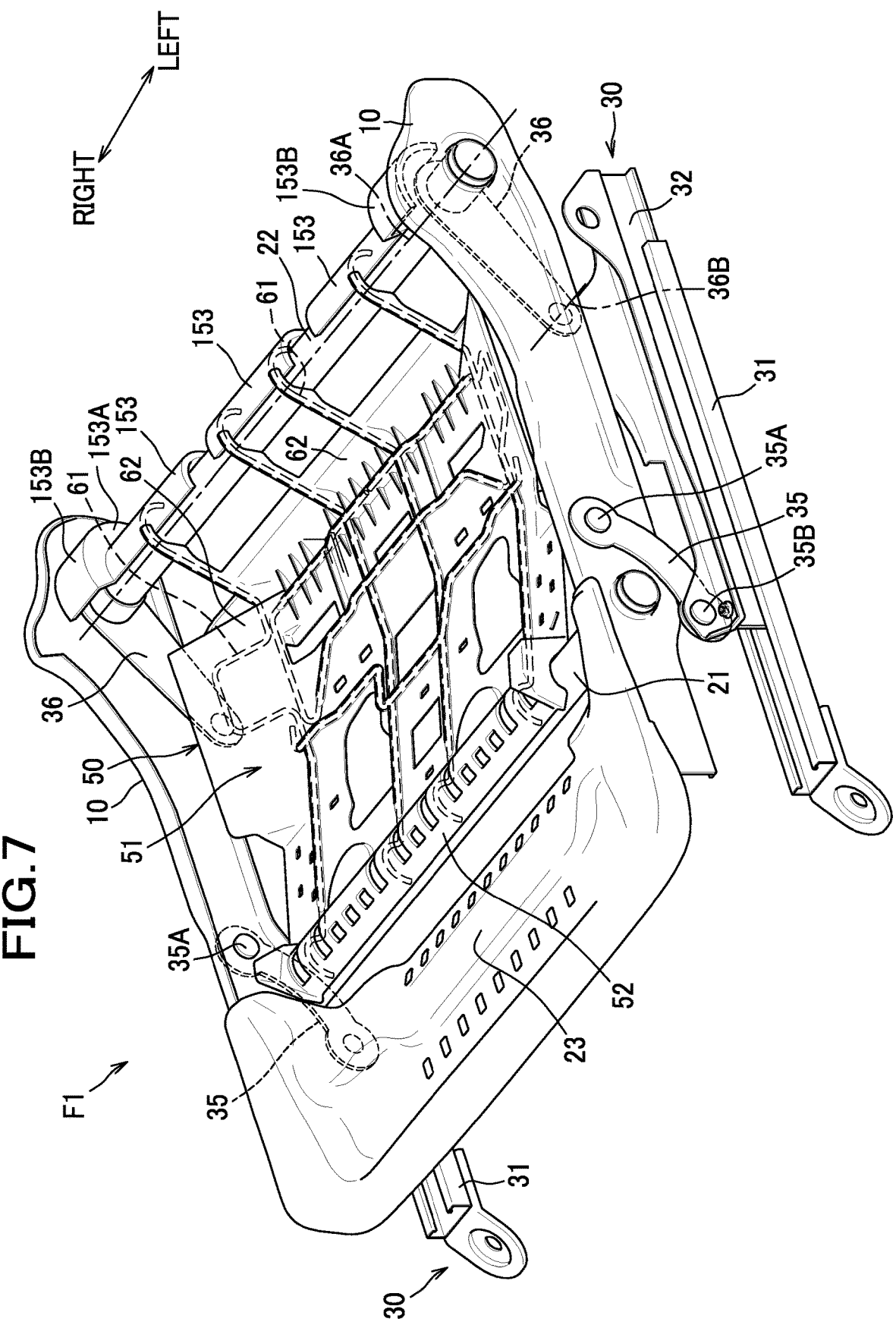
FIG. 7 is a perspective view showing a cushion frame and a supporting member in a fourth embodiment.
Figure 8:
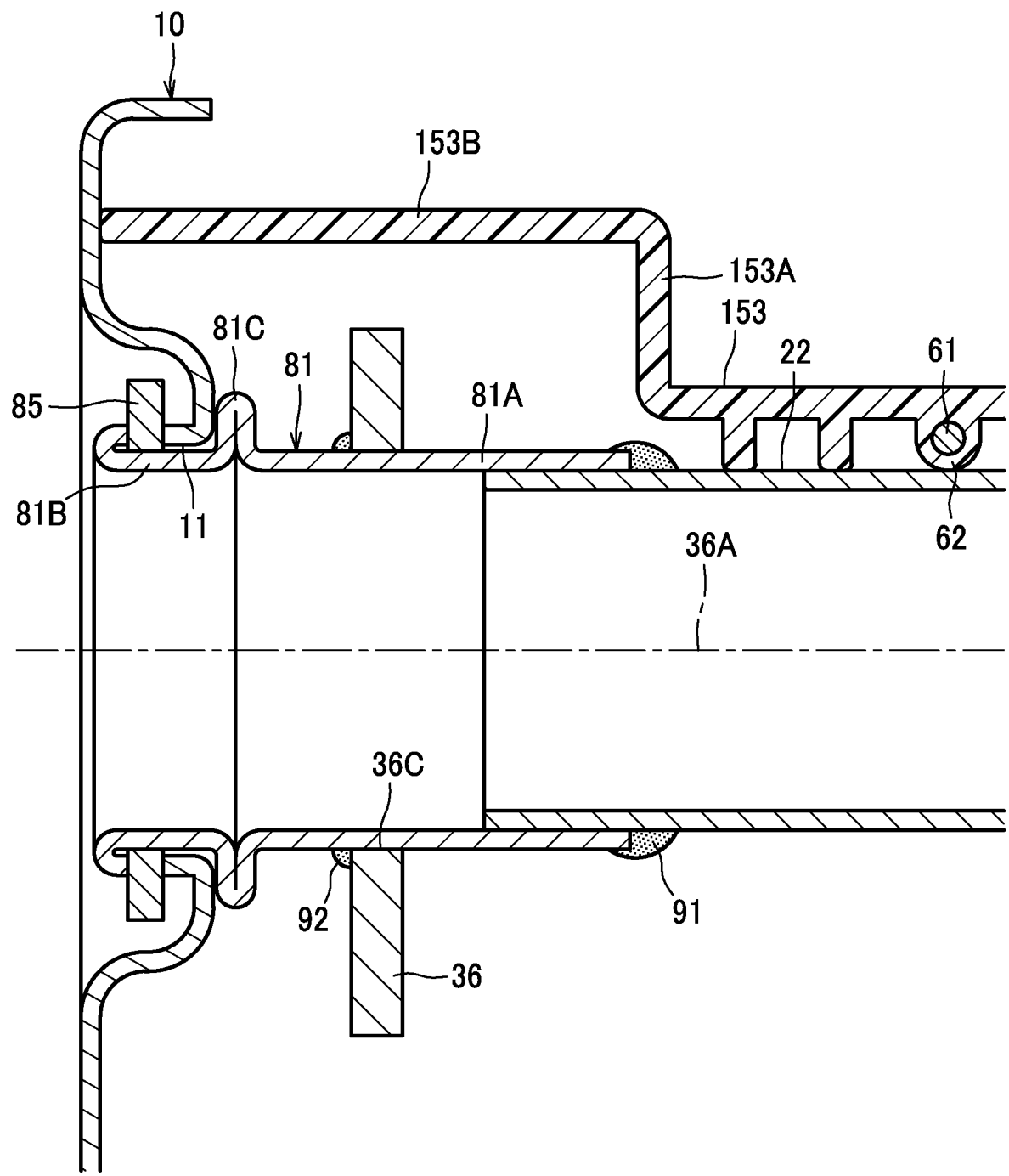
FIG. 8 is a section view taken along an axis of a rear frame of the cushion frame in the fourth embodiment.

In the fourth embodiment, as shown in FIG. 7 and FIG. 8, the rear hook portion 153 of the supporting member 50 is configured to contact the side frame 10 instead of the rear link 36. To be more specific, the rightmost hook portion 153 includes, at its right end portion, a radially extending portion 153A extending radially outward, and a restriction portion 153B extending from the radially extending portion 153A toward the side frame 10. The restriction portion 153B is configured to contact the side frame 10 when the supporting member 50 tends to move rightward, to thereby restrict the position of the supporting member 50 in the lateral direction. The restriction portion 153B is comprised of the plastic member 62. The leftmost hook portion 153 has a symmetric arrangement, and similarly includes, at its left end, a restriction portion 153B comprised of the plastic member 62.

In the car seat S configured as described above, the position of the supporting member 50 can be restricted in a manner similar to that as described above in relation to each of the embodiments. Taking into consideration that the side frame 10 is a member commonly provided in the vehicle seat, the supporting member 50, according to the present embodiment, can be restrained from getting displaced with a simple structure made without increasing the manufacturing cost.

In the fourth embodiment, similarly, the plastic member 62 used to form the restriction portion 53A may serve to restrain a noise from being produced.

Fifth Embodiment

Figure 9:
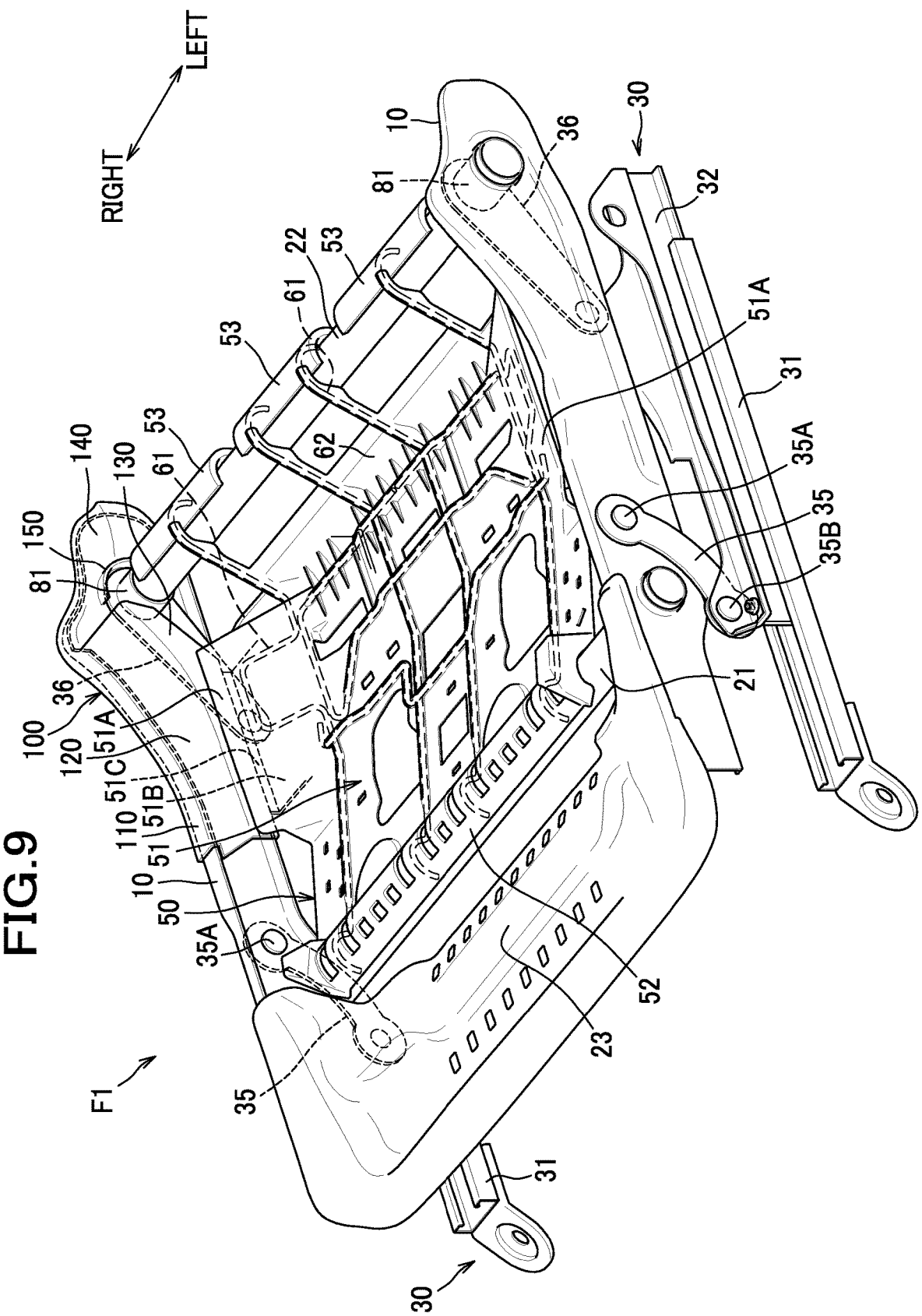
FIG. 9 is a perspective view showing a cushion frame and a supporting member in a fifth embodiment.

As shown in FIG. 9, a car seat S according to the fifth embodiment comprises a cover member 100 at a rear portion of the side frame 10.

The cover member 100 is made of plastic, and configured to cover the rear portion of the side frame 10. Such a cover member 100 is provided to each of the left and right side frames 10; in FIG. 9, however, only the right cover member 100 is illustrated, and illustration of the left cover member 100 is omitted.

The cover member 100 includes an upper wall portion 110 configured to cover an upper surface of the side frame 10, an inclined portion 120 extending from the upper wall portion 110 laterally inward, a first inner wall portion 130 extending from the inclined portion 120 downward, and a second inner wall portion 140 located rearward of the inclined portion 120 and extending from the upper wall portion 110 downward.

Figure 10:
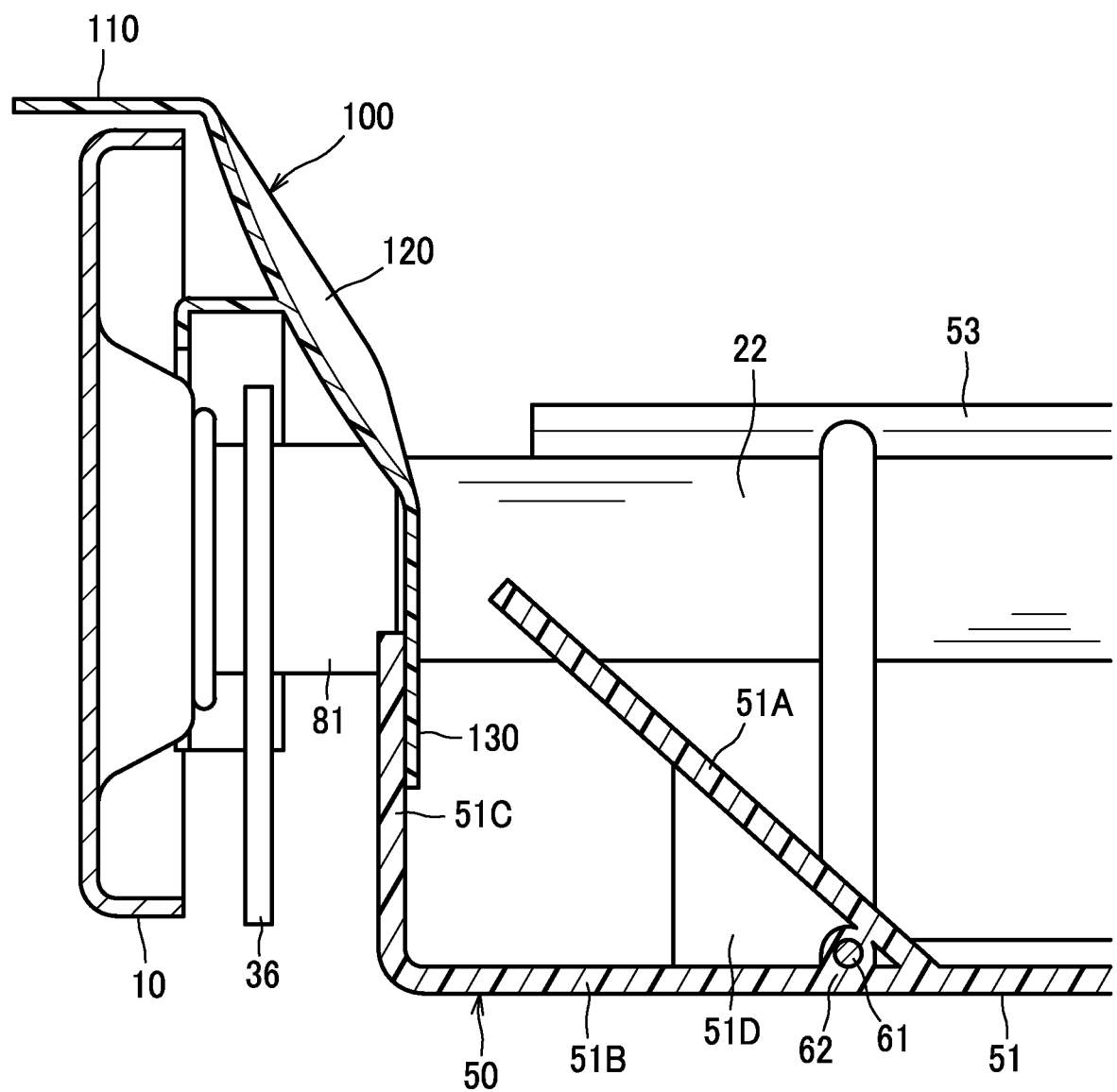
FIG. 10 is a section view taken along a plane passing through a first inner wall portion and a restriction portion of the cushion frame in the fifth embodiment.

The inclined portion 120 is provided frontward of the rear frame 22. The inclined portion 120 extends in a laterally-inward-and-downward direction, as shown in FIG. 10.

The first inner wall portion 130 is an example of an inner wall portion, and located at a laterally inner side of the side frame 10 and the rear link 36.

Referring back to FIG. 9, the second inner wall portion 140 is configured to surround a portion of the side frame 10 to which the rear frame 22 is connected. The second inner wall portion 140 includes an extension portion 150 extending laterally inward along the rear frame 22. To be more specific, the extension portion 150 is a wall protruding from the second inner wall portion 140 laterally inward, and has a shape of a segment of a circle following a contour of the rear end of the rear link 36.

Of the supporting member 50, the left and right hook portions 53 are disposed in positions separate from respective portions, such as the extension portions 150, or the like, of the cover members 100.

The main portion 51 includes, at each of the left and the right of its rear portion, a wing portion 51A extending in a laterally-outward-and-upward direction, an extension portion 51B located under the wing portion 51A and extending laterally outward, and a restriction portion 51C extending from the extension portion 51B upward.

The wing portions 51A are configured to support side regions of the buttocks of an occupant in coordination with the inclined portions 120 of the cover members 100. As shown in FIG. 10, the wing portion 51A is provided to have its upper end portion located in a position laterally inwardly separate from an upper end of the first inner wall portion 130. The wing portion 51A is separate from the inclined portion 120, so that the inclined portion 120 is prevented from restricting the motion of the wing portion 51A.

Formed between the wing portion 51A and the extension portion 51B is a reinforcing portion 51D connecting the wing portion 51A and the extension portion 51B. In this way, the reinforcing portion 51D is provided to thereby reinforce the wing portion 51A.

The restriction portion 51C is located at a laterally outer side of the first inner wall portion 130 of the cover member 100, and is adjacent to the first inner wall portion 130. When the supporting member 50 tends to move leftward, the right restriction portion 51C contacts the first inner wall portion 130 from the right side (i.e., from the laterally outer side), to thereby restrict the position of the supporting member 50 in the lateral direction. The restriction portion 51C is comprised of the plastic member 62. Although not illustrated, the left restriction portion 51C is located at a laterally outer side of the first inner wall portion 130 of the left cover member 100, and thus contacts the first inner wall portion 130 from the left side (i.e., from the laterally outer side) when the supporting member 50 tends to move rightward.

Although FIG. 10 shows the state in which the restriction portion 51C is in contact with the first inner wall portion 130, the restriction portion 51C and the first inner wall portion 130 may preferably be located with some clearance left therebetween under normal conditions so that placement of the supporting member 50 into the cushion frame F1 may be facilitated. It stands to reason that the clearance between each of the restriction portions 51C and the first inner wall portion 130 is set to be small, for example, 10 millimeters or less, enough to enable the restriction portions 51C to place the restriction on the position of the supporting member 50 in the lateral direction. Moreover, the clearance between the restriction portion 51C and the first inner wall portion 130 may be set to be smaller than a distance between the extension portion 150 of the cover member 100 and the hook portion 53 of the supporting member 50, so that the hook portion 53 may not get in contact with the extension portion 150 even when the supporting member 50 moves in the lateral direction.

In the car seat S configured in accordance with the fifth embodiment, as well, when the supporting member 50 gets displaced in the lateral direction as a result of occupant's repeated actions of sitting on the seat cushion S1 or repeatedly exerted laterally biased force on the seat cushion S1 on which an occupant is seated, the right or left restriction portion 51C contacts the inner wall portion 130 of the cover member 100, so that a further displacement of the supporting member 50 is restricted. Taking into consideration that the cover member 100 is a member commonly provided in the vehicle seat, the supporting member 50, according to the present embodiment, can be restrained from getting displaced with a simple structure made without increasing the manufacturing cost.

Although a load from an occupant as imposed on the supporting member 50 with its restriction portion 51C being in contact with the first inner wall portion 130 would potentially produce a scraping noise due to rubbing between the first inner wall portion 130 and the restriction portion 51C, such a noise may be restrained from being produced because the restriction portion 51C is comprised of the plastic member 62 and the first inner wall portion 130 is made of plastic.

Sixth Embodiment

Next, a description will be given of the sixth embodiment of the present invention. A vehicle seat according to the sixth embodiment differs only partly in the construction of the supporting member 50 from that of the fifth embodiment; thus, the description will be directed only to the different construction.

Figure 11:
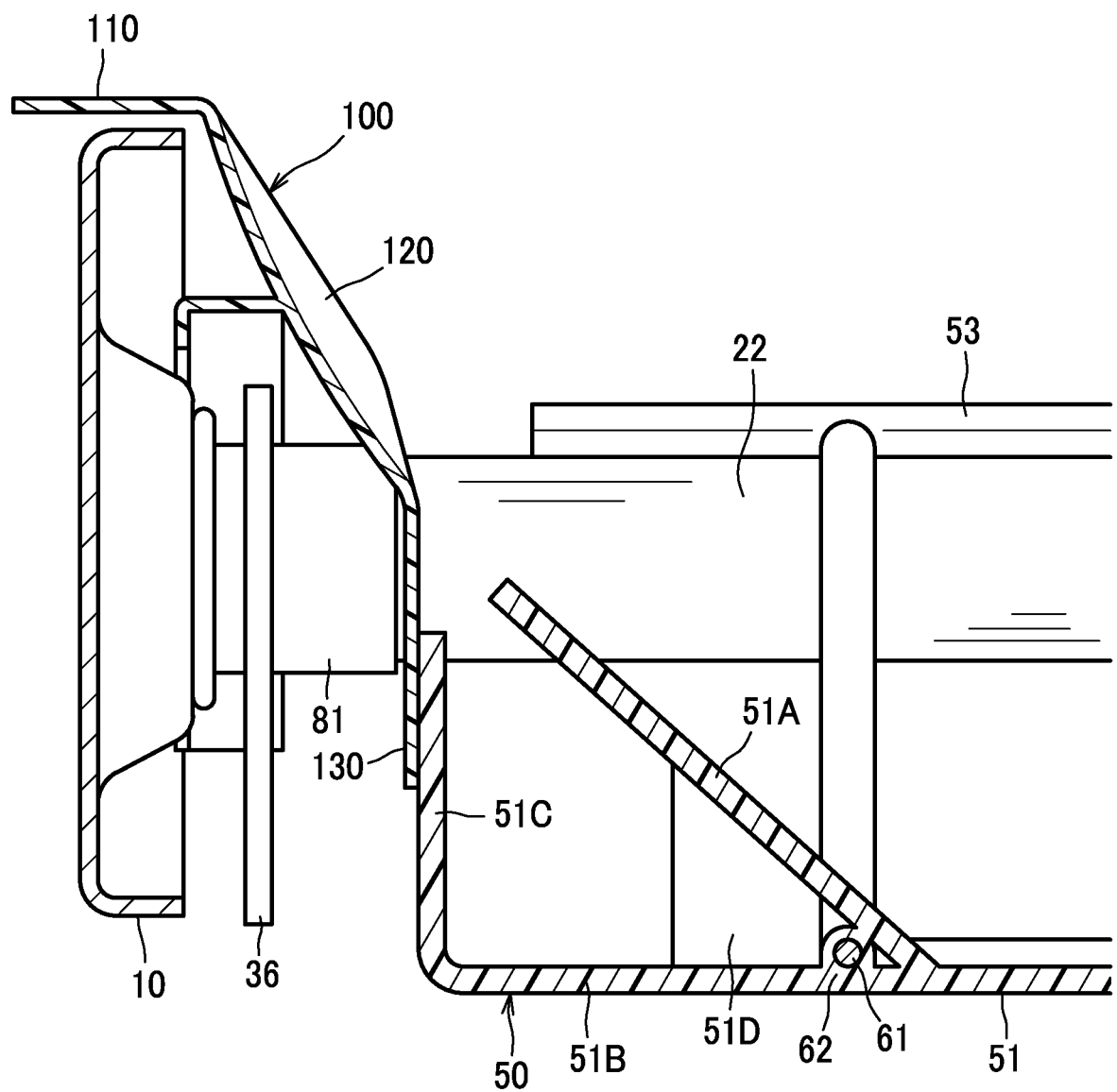
FIG. 11 is a section view taken along a plane passing through a first inner wall portion and a restriction portion of a cushion frame in a sixth embodiment.

As shown in FIG. 11, in the sixth embodiment, the restriction portion 51C of the supporting member 50 is configured to contact the first inner wall portion 130 of the cover member 100 not from the laterally outer side, but from the laterally inner side. To be more specific, the restriction portion 51C is located at a laterally inner side of the first inner wall portion 130, and is adjacent to the first inner wall portion 130. When the supporting member 50 tends to move rightward, the right restriction portion 51C contacts the first inner wall portion 130 from the left side, to thereby restrict the position of the supporting member 50 in the lateral direction. When the supporting member 50 tends to move leftward, the left restriction portion 51C contacts the first inner wall portion 130 from the right side, to thereby restrict the position of the supporting member 50 in the lateral direction.

In the car seat S configured as described above, the position of the supporting member 50 can be restricted in a manner similar to that as described above in relation to each of the embodiments.

Although some embodiments of the present invention have been described above, the present invention is not limited to the respective embodiments described above. Specific configurations may be modified where appropriate without departing from the gist of the present invention as will be described below.

In the above-described embodiments, the vehicle seat comprises a height adjustment mechanism, but the height adjustment mechanism may not necessarily be provided. For example, even if the rear link 36 is not provided in the first embodiment, the collar 70 may contact the side frame 10 whereby the motion of the collar 70 in the lateral direction is restricted; therefore, the collar 70 can still serve to restrict the position of the supporting member 50.

Although the first embodiment has been described as having the right hook portion 53 and the left hook portion 53 configured to contact the collars 70 respectively, an alternative configuration may be such that one of the left and right hook portions 53 is contactable with the collar 70 while the other of the left and right hook portions 53 is contactable with the first cylindrical portion 81A of the bracket 81. Alternatively, a tubular member may be provided at only one of the left and right sides and configured to contact a hook portion, while another different configuration for restricting the position may be provided at the other of the left and right sides.

Although the first embodiment and the second embodiment have been described as having the tubular members provided in positions between the rear hook portions 53, 153 and the side frames 10, such tubular members may be provided in positions between the front hook portions 52 and the side frames 10 so as to be contactable with the front hook portions 52

Although the first embodiment and the second embodiment have been described as comprising the supporting member 50 disposed in the cushion frame F1, such a supporting member may be disposed in the seat back frame. In this alternative configuration as well, a supporting member may be disposed to bridge the seat back frame in an upward-downward direction, and a tubular member such as a collar, provided between a hook portion and a side frame is configured to contact the hook portion to thereby restrict the position of the supporting member.

Although the color 70 and the first cylindrical portion 81A of the bracket 81 as an example of a tubular member in the first embodiment and the second embodiment are each configured to have a cylindrical shape, the tubular member may be formed in a tubular shape other than such a cylindrical shape.

The shape of the tubular member may not necessarily be a completely closed tubular shape, but may be a shape of a partially cutaway tube, e.g., having a C-shaped cross section.

Although the portion of the hook portion 53 which contacts the tubular member in the first embodiment and the second embodiment is comprised of the plastic member 62, the portion of the hook portion which contacts the tubular member may be made of metal.

The rear link 36 is configured to be integrally rotatable together with the rear frame 22 in each of the embodiments described above, but may alternatively be configured to be rotatable relative to the rear frame 22. For example, the rear frame 22 may have an end portion fixed to the side frame 10, whereas the rear link 36 may be rotatably supported by the rear frame 22. In other words, an alternative configuration may be such that the rear link 36 is rotatably joined to the side frame 10 via the rear frame 22. In this configuration as well, the relative positions of the restriction portion 53A and the rear link 36 is unlikely to change when the rear link 36 is caused to rotate, for example, in the third embodiment and the fourth embodiment, so that the restrictions on the position can be placed by the restriction portion 53A without fail.

The vehicle seat in each of the embodiment described above comprises a height adjustment mechanism, but may comprise no height adjustment mechanism. For example, even if the rear link 36 is not provided in the fourth embodiment, the restriction portion 153B may be configured to contact the side frame 10 to thereby restrict the position of the supporting member 50.

Although the third embodiment described above is such that the right restriction portion 53A and the left restriction portion 53A are both configured to contact the corresponding rear links 36, an alternative configuration may be feasible such that one of the left and right restriction portions is configured to contact a rotatable link such as a rear link, while the other restriction portion is configured to contact the side frame. Alternatively, a restriction portion may be provided at only one of the left and right sides and configured to contact a side frame or a rotatable link, while another different configuration for the restriction of the position may be provided at the other of the left and right sides.

Although the third embodiment and the fourth embodiment described above are such that the rear hook portion 53, 153 includes the restriction portion 53A, 153B, the front hook portion 52 may include a restriction portion. In other words, an alternative configuration may be feasible such that the front hook portion 52 is contactable with the side frame 10 or the front link 35. If the hook portion 52 is configured to contact the front link 35, the front link 35 may preferably be located at a laterally inside of the side frame 10.

Although the third embodiment and the fourth embodiment described above are such that the supporting member 50 is disposed in the cushion frame F1, such a supporting member may be disposed in the seat back frame. In this alternative configuration as well, a supporting member may be disposed to bridge the seat back frame in an upward-downward direction, and a hook portion may be configured to contact the side frame or the like, to thereby restrict the position of the supporting member.

Although the sixth embodiment described above is such that the restriction portion 51C provided separately from the wing portion 51A is configured to contact the first inner wall portion 130 from the laterally inner side, an alternative configuration may be feasible such that the wing portion 51A is configured to contact the first inner wall portion 130 from the laterally inner side. In other words, the wing portion 51A may be configured as a restriction portion that is configured to contact the cover member 100 to thereby restrict the position of the supporting member 50 in the lateral direction.

Although the fifth embodiment described above is such that the restriction portions 51C are provided at the left and right sides of the main portion 51, and these restriction portions 51C are configured to contact the first inner wall portions 130 of the cover members 100, respectively, from the laterally outer sides, an alternative configuration may be feasible such that a pair of restriction portions provided with the first inner wall portion 130 interposed therebetween are provided at one of the left and right sides of the main portion 51 so that the pair of restriction portions are configured to be contactable with the first inner wall portion 130 from the laterally inner and outer sides. Alternatively, the restriction portion may be provided only at one of the left and right sides and configured to contact the cover member 100, while another configuration for restricting the position may be provided at the other of the left and right sides.

Although the fifth embodiment and the sixth embodiment described above are such that the supporting member 50 is disposed in the cushion frame F1, the supporting member may be disposed in the seat back frame. In this alternative configuration as well, a supporting member may be disposed to bridge the seat back frame in an upward-downward direction, and a main portion of the supporting member may be configured to contact the cover member with which the side frame is covered, to thereby restrict the position of the supporting member.

In the above-described embodiment, the car seat S to be installed in an automobile is illustrated as an example of a vehicle seat, but the vehicle seat may not be limited thereto, and may be a seat to be installed in a vehicle other than an automobile, such as a rail car, a ship, and an aircraft, etc.

Furthermore, any of the elements explained in relation to the above-described embodiments and modified examples may be implemented in combination as desired.

The invention claimed is:

1. A vehicle seat comprising:
   a pair of side frames disposed separately from each other in a lateral direction;
   a pair of connecting frames disposed separately from each other to connect the pair of side frames;
   a supporting member comprising a plate-shaped main portion, and hook portions hooked on the pair of connecting frames,
     the supporting member being laid to bridge the pair of connecting frames, and configured to support an occupant,
     the plate-shaped main portion comprising a bottom plate, and a wall raised from the bottom plate toward the hook portions; and
   a position restricting member configured to contact the supporting member to thereby restrict a position of the supporting member in the lateral direction,
   wherein the position restricting member is located on a laterally outer side of the wall.

2. The vehicle seat according to claim 1, wherein the pair of side frames comprises a flange extending in a laterally inward direction,
   wherein the position restricting member is configured to contact the supporting member in a position laterally inward of the flange.

3. The vehicle seat according to claim 1, further comprising a link of a height adjustment mechanism, the link being rotatably connected to a corresponding one of the pair of side frames,
   wherein the position restricting member is located adjacent to the link.

4. The vehicle seat according to claim 3, wherein the position restricting member is configured to contact the link when restricting the position of the supporting member.

5. The vehicle seat according to claim 1, wherein the position restricting member has an upper end located above the plate-shaped main portion.

6. The vehicle seat according to claim 1,
   wherein the position restricting member is a tubular bracket via which the connecting frame is connected to a corresponding one of the side frames, the bracket being fitted on the connecting frame, and
   wherein the bracket has a laterally inner end contactable with a laterally outer end of the hook portion.

7. The vehicle seat according to claim 1, wherein the position restricting member is a tubular member in which the connecting frame is disposed and which is provided in a position between the hook portions and the pair side frames and configured to contact the hook portion.

8. The vehicle seat according to claim 7, wherein the tubular member is not fixed to the connecting frame.

9. The vehicle seat according to claim 7, wherein the tubular member is rotatably supported by the connecting frame.

10. The vehicle seat according to claim 7, wherein the tubular member is fixed to the connecting frame.

11. The vehicle seat according to claim 7, wherein the supporting member comprises a metal wire and a plastic member with which at least part of the metal wire is covered, and
    wherein a portion of the hook portion which is configured to contact the tubular member is comprised of the plastic member.

12. The vehicle seat according to claim 7, wherein the tubular member is made of plastic.

13. The vehicle seat according to claim 7, wherein the tubular portion is not fixed to the connecting frame.

14. The vehicle seat according to claim 13, wherein the tubular portion has a laterally inner end contactable with a laterally outer end of the hook portion, and a laterally outer end contactable with the side frame.

15. The vehicle seat according to claim 13, further comprising a link of a height adjustment mechanism, the link being rotatably connected to a corresponding one of the side frames,
    wherein the tubular portion has a laterally inner end contactable with a laterally outer end of the hook portion, and a laterally outer end contactable with the link.

* * * * *